UNITED STATES PATENT OFFICE.

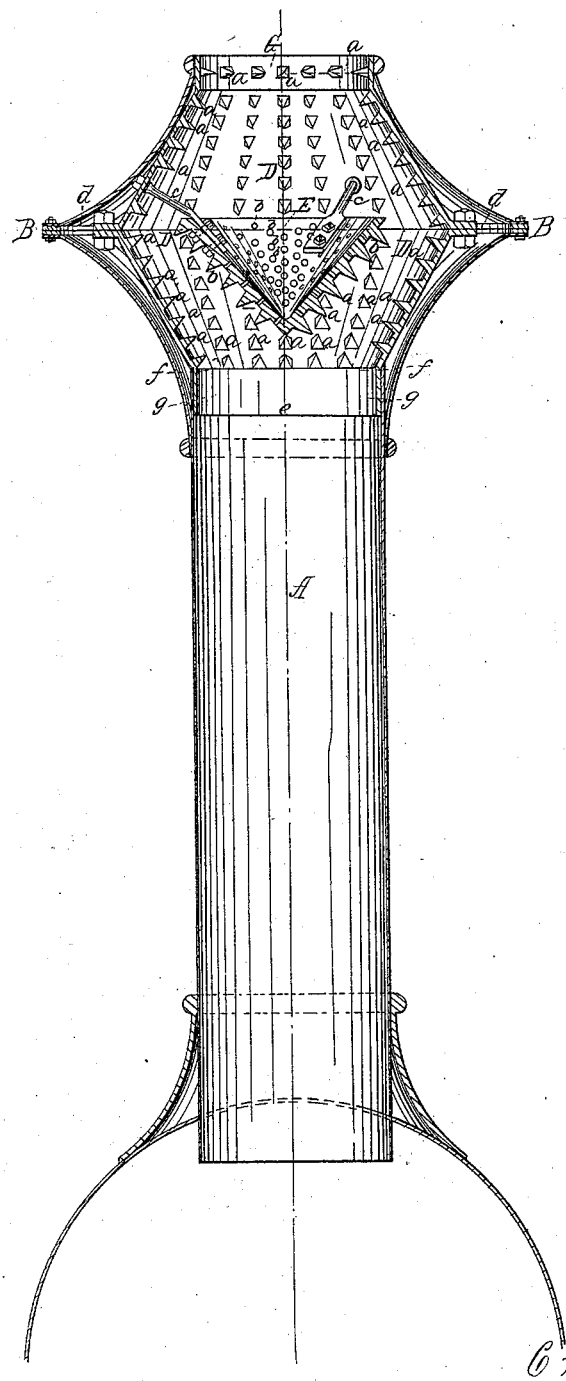

CHARLES P. NOBLE, OF CHICAGO, ILLINOIS.

IMPROVEMENT IN SMOKE-STACKS FOR LOCOMOTIVE-ENGINES.

Specification forming part of Letters Patent No. 39,493, dated August 11, 1863.

*To all whom it may concern:*

Be it known that I, CHARLES P. NOBLE, of Chicago, in the county of Cook and State of Illinois, have invented certain new and useful Improvements in Smoke-Stacks for Coal and Wood Burning Locomotive-Engines; and I do hereby declare that the following is a full, clear, and exact description of the construction and operation of the same, reference being had to the annexed drawing of one figure, which is a vertical section of a smoke-stack, showing the improvements, and to the letters of reference marked thereon.

The nature of my invention consists in providing the pipe of an ordinary smoke-stack with a globular, conical, or other swell at or near its upper end, in suspending, by means of small rods $c\ c$, a deflecting-head, E, to turn the draft from a straight line without checking or impeding its strength or force, and in providing the deflecting-head E, the inner surface of the swell D, and the balance of the pipe above the swell C with teeth or projections $a\ a$, to break the force and life of the coals and sparks as they pass out, without injury to the draft.

To enable others skilled in the art to make and use my invention, I will proceed to describe its construction and operation.

The pipe A is an ordinary pipe, or one made in the same manner, extending as far up as the line $f$, where it is cut off. I then add, by insertion of a neck, $g$, (or otherwise,) a globular, conical, or swelled pipe, D, nearly or quite double the capacity of the pipe A. It is made of cast-iron, or other suitable material, and constructed in two parts, and fastened together by the flanges and bolts $d$, of which there are four, or as many as may be desired, and when attached to the pipe A presents to the draft a continuous surface without air or draft-passages through the sides of any kind.

The upper end or mouth, C, is contracted and brought to the same diameter as the pipe A, and is carried above the swell to bring it to the height of ordinary smoke-stacks. Projections or teeth $a\ a$ are attached to the inner surface of the pipe D and mouth C, and are made of any desired length. I consider about one inch the best, but above the deflecting-head they may be interlocked or carried across as rods without impeding the draft of the stack to an injurious extent. In this hollow globe D, I insert a deflecting-head, E, which is an inverted hollow cone the base of which is of about equal diameter with that of the pipe A, tapering at an angle of about forty-five degrees to the vortex, and is usually made of cast-iron. This head is suspended in the pipe D by the rods or bars $c\ c$, or their equivalents, with its base near the center of the globe, and its axis on a line with the center of the pipe A. It may be perforated, as shown at $b\ b$, to allow a free escape of the exhaust, and is furnished with projections or teeth $a\ a$, to break and retard the sparks and cinders until their vitality has become extinct; but it will, in a great measure, produce this effect without either or both the perforations or projections, as will also the pipe D and mouth C. The outside of the stack may be left plain, or furnished with an ornamental casing, as shown at D.

My improvement may be added to the double stacks, now in general use, by cutting off the inside pipe at the proper point, and attaching them to its upper end, leaving its lower part and all of the outside pipe precisely as they were, thus forming a smoke-stack which will so oppose, break, and retard the passage of sparks and cinders that their life or vitality will be extinguished by the time they reach the open air, thereby removing all danger of setting fire to contiguous property, while the draft is not checked or impeded, and one which may be used without netting over the top with perfect security, or with it, if desired, and is easily attached to any locomotive-engine now in use, but is more particularly adapted to those burning coal.

I do not claim as my invention a deflecting-head or inverted cone, nor do I claim enlarging the pipe when a funnel shape is give to such enlargement; but

What I claim as my invention, and desire to secure by Letters Patent, is—

1. The globular or swelled pipe D, when the inner surface is continuous and is provided with the projections $a\ a$, and when its discharging orifice or mouth C is contracted nearly or quite to the diameter of the pipe A.

2. The combination of the swelled pipe D, deflecting-head E, rods $c$, and teeth $a$, with the pipe A, substantially as set forth and specified.

CHAS. P. NOBLE.

Witnesses:
G. W. GRAY,
J. C. HAINES.